(12) United States Patent
Lee et al.

(10) Patent No.: US 8,478,770 B2
(45) Date of Patent: Jul. 2, 2013

(54) ELECTRONIC DEVICE AND METHOD FOR SEARCHING RELATED TERMS

(75) Inventors: Chung-I Lee, New Taipei (TW); Chien-Fa Yeh, New Taipei (TW); Chiu-Hua Lu, New Taipei (TW); Gen-Chi Lu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/217,272

(22) Filed: Aug. 25, 2011

(65) Prior Publication Data

US 2012/0197878 A1    Aug. 2, 2012

(51) Int. Cl.
*G06F 7/00* (2006.01)
(52) U.S. Cl.
USPC ....................................................... 707/758
(58) Field of Classification Search
None
See application file for complete search history.

(56) References Cited

U.S. PATENT DOCUMENTS

| 7,603,349 | B1 * | 10/2009 | Kraft et al. | 1/1 |
| 2008/0154886 | A1 * | 6/2008 | Podowski et al. | 707/5 |
| 2010/0106719 | A1 * | 4/2010 | Donato et al. | 707/728 |

FOREIGN PATENT DOCUMENTS

EP    2045735 A2    4/2009

OTHER PUBLICATIONS

"Use of Syntactic Context to Produce Term Association Lists for Text Retrieval", Gregory Grefenstette Computer Science Department University of Pittsburgh, Jun. 21, 1992.

* cited by examiner

*Primary Examiner* — Robert Beausoliel, Jr.
*Assistant Examiner* — Nirav K Khakhar
(74) *Attorney, Agent, or Firm* — Altis Law Group, Inc.

(57) ABSTRACT

A method for searching related terms first calculates a direct relationship between every two of a plurality of query terms to obtain a direct related matrix, and calculates a related score between every two of the query terms to obtain a related score matrix. The method further calculates an indirect relationship between every two of the query terms according to the direct relationship and the related score, and determines indirect terms of each query term according to the indirect relationship between every two of the query terms.

13 Claims, 9 Drawing Sheets

$$R = \begin{pmatrix} & \text{Term}_1 & \text{Term}_2 & \text{Term}_3 & \text{Term}_4 & \text{Term}_5 & \text{Term}_6 & \text{Term}_7 \\ \text{Term}_1 & 0 & 2 & 3 & 0 & 0 & 5 & 0 \\ \text{Term}_2 & 1 & 0 & 0 & 0 & 0 & 0 & 1 \\ \text{Term}_3 & 2 & 0 & 0 & 4 & 5 & 0 & 0 \\ \text{Term}_4 & 0 & 0 & 4 & 0 & 8 & 0 & 0 \\ \text{Term}_5 & 0 & 0 & 5 & 8 & 0 & 0 & 0 \\ \text{Term}_6 & 5 & 0 & 0 & 0 & 0 & 0 & 6 \\ \text{Term}_7 & 0 & 1 & 0 & 0 & 0 & 6 & 0 \end{pmatrix}$$

FIG. 5

$$P = \begin{array}{c} \\ \text{Term}_1 \\ \text{Term}_2 \\ \text{Term}_3 \\ \text{Term}_4 \\ \text{Term}_5 \\ \text{Term}_6 \\ \text{Term}_7 \end{array} \begin{pmatrix} \text{Term}_1 & \text{Term}_2 & \text{Term}_3 & \text{Term}_4 & \text{Term}_5 & \text{Term}_6 & \text{Term}_7 \\ 0.2 & 0.3 & 0.3 & 0.0 & 0.1 & 0.0 & 0.0 \\ 0.2 & 0.1 & 0.1 & 0.5 & 0.0 & 0.0 & 0.1 \\ 0.1 & 0.3 & 0.0 & 0.4 & 0.1 & 0.0 & 0.1 \\ 0.0 & 0.2 & 0.6 & 0.0 & 0.0 & 0.1 & 0.1 \\ 0.1 & 0.0 & 0.0 & 0.0 & 0.0 & 0.9 & 0.0 \\ 0.0 & 0.0 & 0.3 & 0.0 & 0.2 & 0.0 & 0.5 \\ 0.0 & 0.4 & 0.0 & 0.1 & 0.0 & 0.4 & 0.1 \end{pmatrix}$$

FIG. 6

$$P' = \begin{matrix} & \text{Term}_1 & \text{Term}_2 & \text{Term}_3 & \text{Term}_4 & \text{Term}_5 & \text{Term}_6 & \text{Term}_7 \\ \text{Term}_1 & 0.0 & 0.2 & 0.3 & 0.0 & 0.0 & 0.5 & 0.0 \\ \text{Term}_2 & 0.5 & 0.0 & 0.0 & 0.0 & 0.0 & 0.0 & 0.5 \\ \text{Term}_3 & 0.18 & 0.0 & 0.00 & 0.36 & 0.45 & 0.00 & 0.00 \\ \text{Term}_4 & 0.0 & 0.0 & 0.33 & 0.0 & 0.67 & 0.0 & 0.0 \\ \text{Term}_5 & 0.0 & 0.0 & 0.38 & 0.62 & 0.0 & 0.0 & 0.0 \\ \text{Term}_6 & 0.45 & 0.0 & 0.0 & 0.0 & 0.0 & 0.0 & 0.55 \\ \text{Term}_7 & 0.0 & 0.14 & 0.0 & 0.0 & 0.0 & 0.86 & 0.0 \end{matrix}$$

$$
R' = \begin{array}{c} \\ \text{Term}_1 \\ \text{Term}_2 \\ \text{Term}_3 \\ \text{Term}_4 \\ \text{Term}_5 \\ \text{Term}_6 \\ \text{Term}_7 \end{array} \begin{array}{c} \text{Term}_1 \ \text{Term}_2 \ \text{Term}_3 \ \text{Term}_4 \ \text{Term}_5 \ \text{Term}_6 \ \text{Term}_7 \\ \left( \begin{array}{ccccccc} 0.0 & 0.9 & 1.7 & 2.2 & 1.3 & 0.0 & 3.0 \\ 0.0 & 0.0 & 0.3 & 0.1 & 0.1 & 0.4 & 0.0 \\ 0.5 & 1.4 & 0.0 & 0.0 & 0.2 & 4.9 & 0.4 \\ 1.2 & 1.2 & 0.0 & 0.0 & 0.0 & 0.1 & 0.1 \\ 0.1 & 0.0 & 0.0 & 0.0 & 0.4 & 7.2 & 0.4 \\ 0.0 & 3.9 & 1.5 & 0.6 & 0.5 & 0.0 & 0.0 \\ 0.2 & 0.0 & 1.9 & 0.5 & 1.2 & 0.0 & 0.0 \end{array} \right) \end{array}
$$

FIG. 9

ELECTRONIC DEVICE AND METHOD FOR SEARCHING RELATED TERMS

BACKGROUND

1. Technical Field

Embodiments of the present disclosure relate to file search technology, and particularly to an electronic device and method for searching related terms using the electronic device.

2. Description of Related Art

Related terms of preset query terms can be obtained using a natural language processing (NLP) method by calculating a relationship between every two of the preset query terms. However, the NLP technology only calculates a direct relationship between every two of the preset query terms, and generates the related terms having the direct relation with the preset query terms. That is to say, the NLP technology cannot calculate an indirect relationship between every two of the preset query terms to generate the related terms having the indirect relationship with the preset query terms, which influences search results corresponding to the preset query terms.

For example, suppose that a query term is "baseball," the query term "baseball" has a direct relationship with a first term "sport," and the first term "sport" further has a direct relationship with a second term "basketball." Thus, the query term "baseball" has an indirect relation with the second term "basketball." The NLP technology can determine the first term "sport" as the related term of the query term "baseball," but cannot determine the second term "basketball" as the related term of the query term "baseball." It is thus less than efficient to implement a search operation according to the query term. Therefore, a more efficient method for searching related terms is desired.

DETAILED DESCRIPTION

All of the processes described below may be embodied in, and fully automated via, functional code modules executed by one or more general purpose electronic devices or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Figure 1:
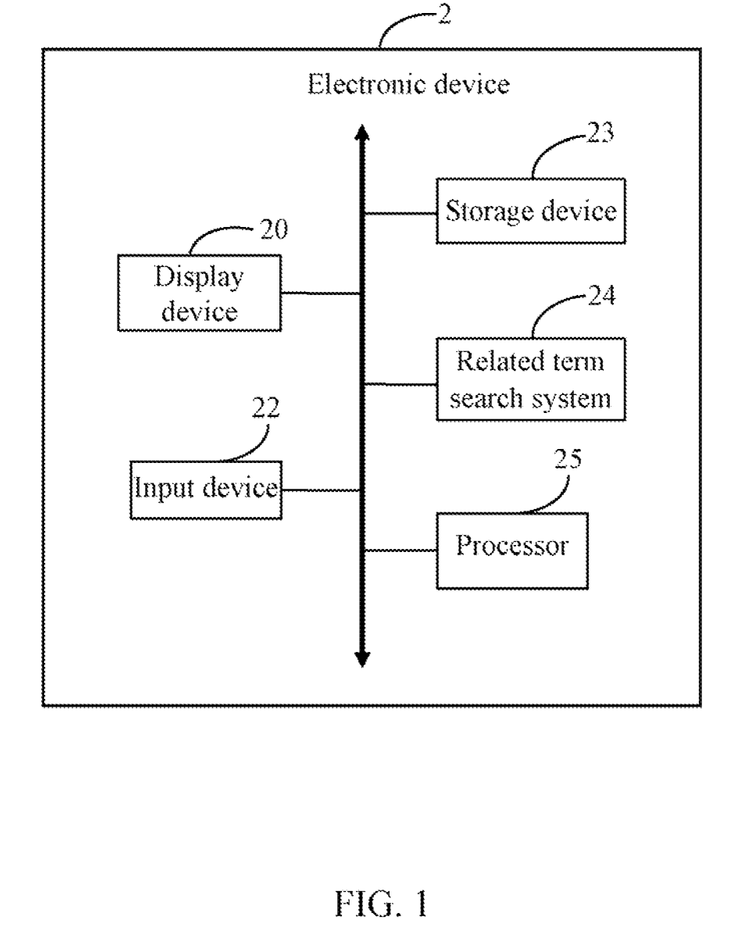
FIG. 1 is a block diagram of one embodiment of an electronic device including a related term search system.

FIG. 1 is a block diagram of one embodiment of an electronic device 2 including a related term search system 24. In the embodiment, the electronic device 2 further includes a display device 20, an input device 22, a storage device 23, and at least one processor 25. The related term search system 24 may be used to determine related terms having indirect relationships with a plurality of query terms stored in the storage device 23. A detailed description will be given in the following paragraphs.

The display device 20 may be used to display search results matched with the determined related terms, and the input device 22 may be a mouse or a keyboard used to input computer readable data.

Figure 2:
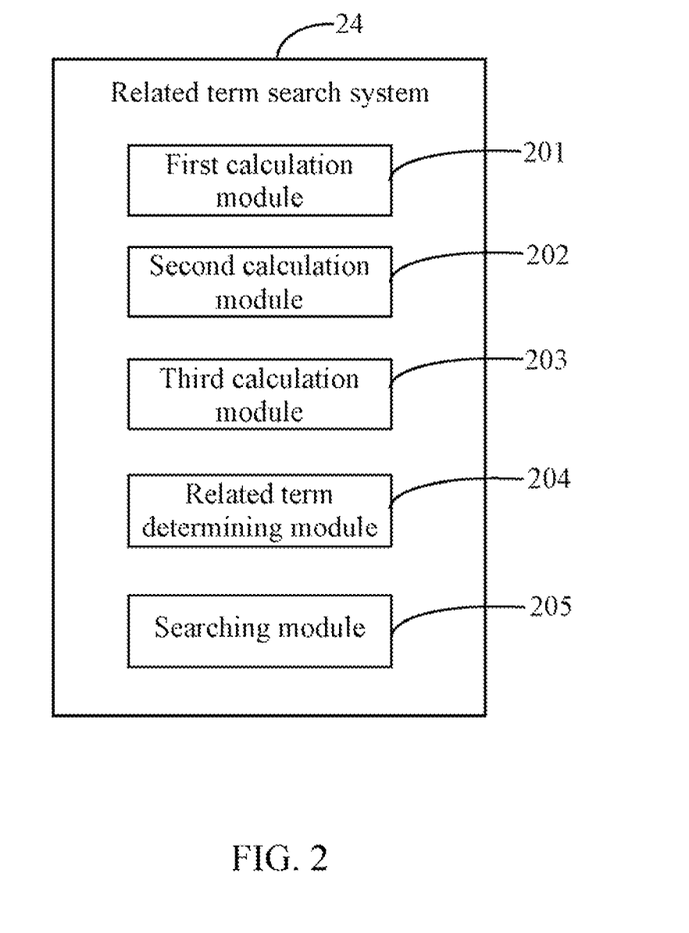
FIG. 2 is a block diagram of one embodiment of the related term search system included in the electronic device of FIG. 1.

FIG. 2 is a block diagram of one embodiment of the related term search system 24 in the electronic device 2. In one embodiment, the related term search system 24 may include one or more modules, for example, a first calculation module 201, a second calculation module 202, a third calculation module 203, a related term determining module 204, and a searching module 205. The one or more modules 201-204 may comprise computerized code in the form of one or more programs that are stored in the storage device 23 (or memory). The computerized code includes instructions that are executed by the at least one processor 25 to provide functions for the one or more modules 201-204.

Figure 3:
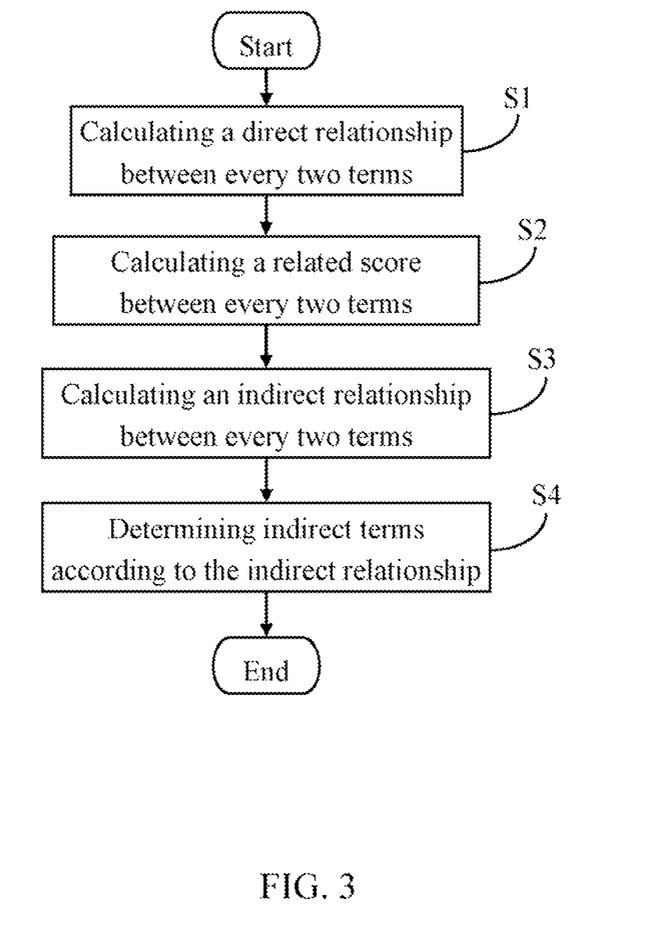
FIG. 3 is a flowchart of one embodiment of a method for searching related terms using the electronic device of the FIG. 1.

FIG. 3 is a flowchart of one embodiment of a method for searching related terms using the electronic device 2. Depending on the embodiment, additional blocks may be added, others removed, and the ordering of the blocks may be changed.

Figure 4:
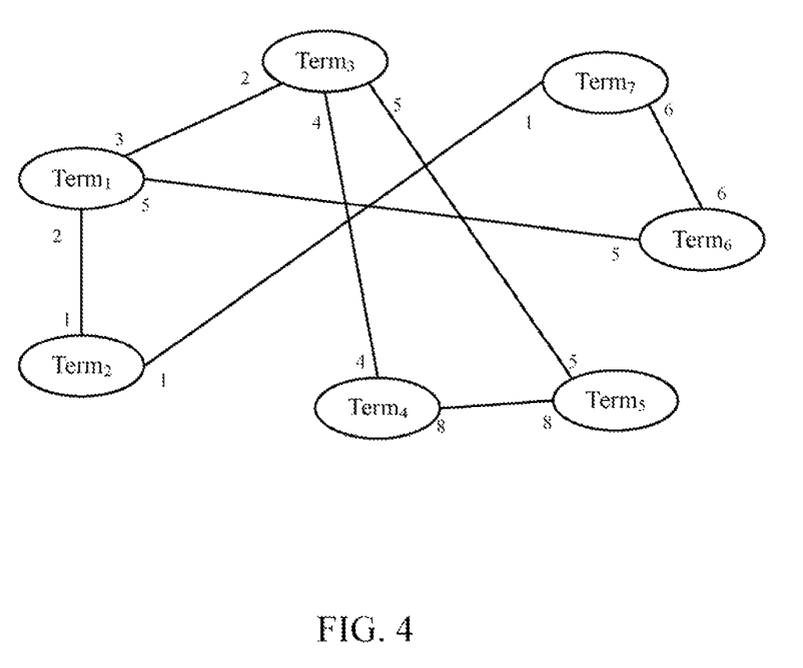
FIG. 4 is a topological diagram of direct relationship between a plurality of query terms.
Figure 5:
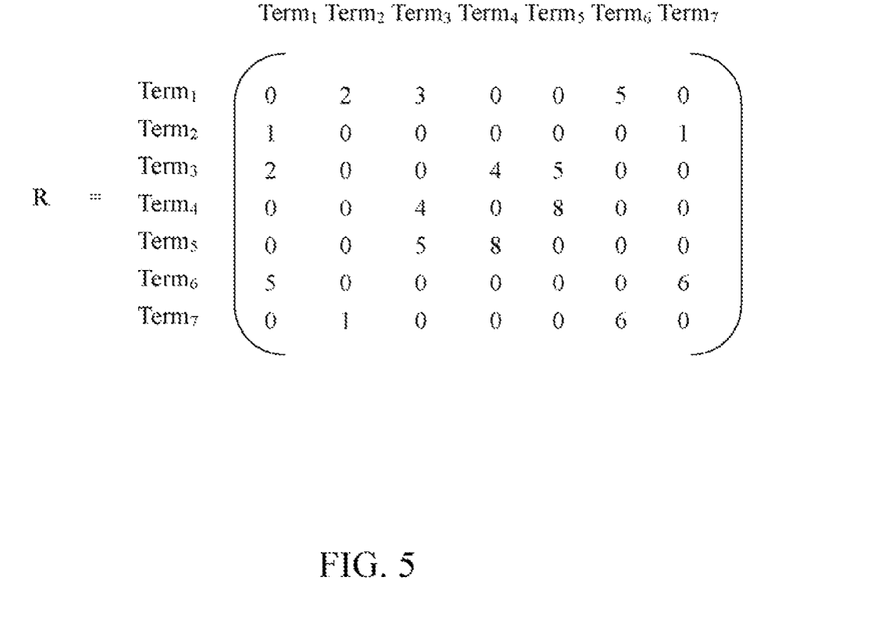
FIG. 5 is an example of a direct related matrix created from the topological diagram of FIG. 4.

In block S1, the first calculation module 201 calculates a direct relationship "$R_{i,j}$" between every two of a plurality of query terms, and obtains a direct related matrix "R" according to all the calculated direct relationship. In one embodiment, the query terms may be inputted by a user, or stored in the storage device 23 in advance. As shown in FIG. 4, a direct relationship from "$Term_1$" to "$Term_2$" is 2, but a direct relationship from "$Term_2$" to "$Term_1$" is 1. That is to say, the direct relationship between two terms is determined according to a sequence of the two terms. As shown in FIG. 5, $R_{i,j}$ represents the direct relationship from "$Term_i$" to "$Term_j$", which is referred to as Relation($term_i$, $term_j$).

Figure 6:
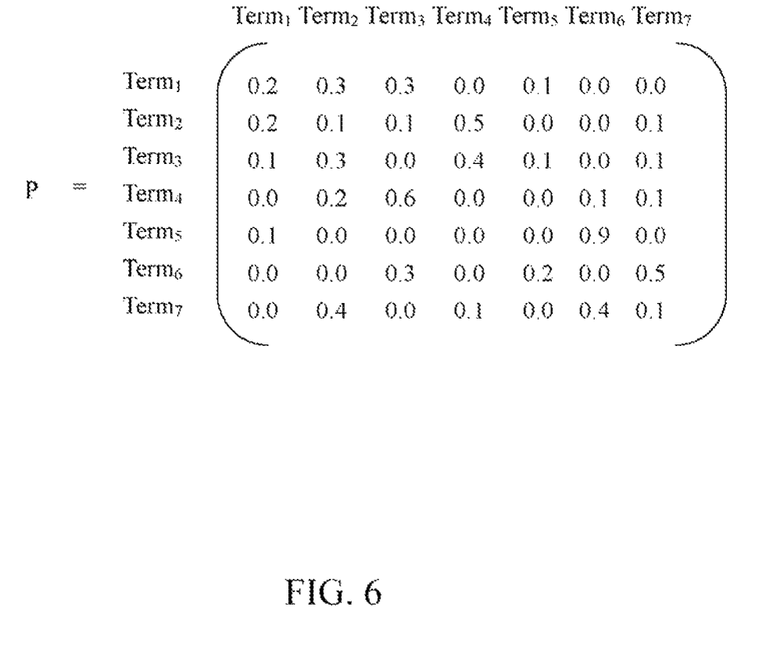
FIGS. 6 and 7 are exemplary schematic diagrams of related score matrices obtained from FIG. 5.

In block S2, the second calculation module 202 calculates a related score between every two of the query terms, obtains a related score matrix according to all the calculated related scores, and stores the related score matrix in the storage device 23. In one embodiment, the related score between every two of the query terms is obtained by calculating a conditional probability between every two of the query terms. As shown in FIG. 6, each element "$P_{i,j}$" in the related score matrix "P" represents a conditional probability between "$Term_i$" and "$Term_j$", where $P_{i,j}=P((Term_i \cap Term_j)|Term_i)$. For example, assume that an occurrence number of a term "A" is 100, and an occurrence number of a term "B" is 30 given the occurrence of the term "A". Thus, $P(A \cap B)|A)=0.3$, that is, the related score from the term "A" to the term "B" is 30%.

Figure 7:
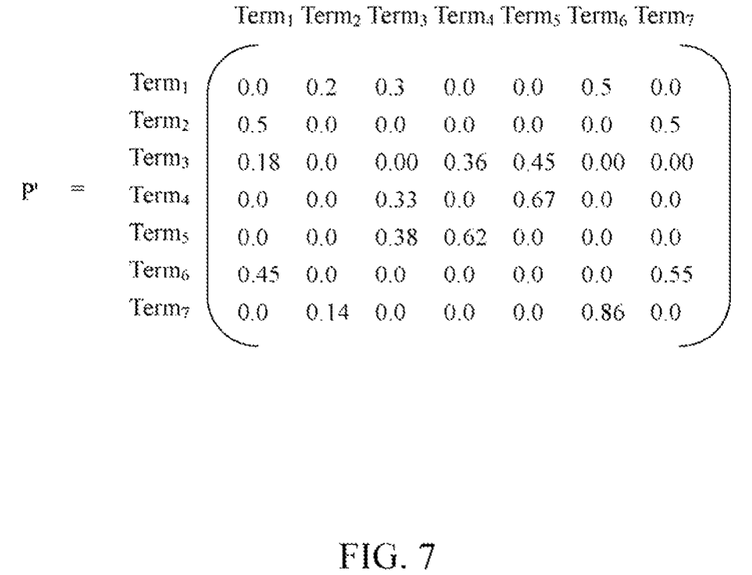

In other embodiments, the second calculation module 202 may calculate the related score using other methods to obtain the related score matrix. For example, assume that a direct relationship from the term "A" to the term "B" is 100, and a direct relationship from the term "B" to a term "C" is 300, where no other terms have a direct relationship with the term "B," which is referred to as A→B→C. Thus, a total related value of the term "B" equals to (100+300)=400, where the term "A" occupies 100 (i.e., 25%), the term "C" occupies 300 (i.e., 75%). That is to say, the related score between the term "B" and the term "C" equals to 0.75, and an indirect relationship between the term "A" and the term "C" equals to 100*0.75=75. Using this method, the second calculation module 202 may calculate the related score between every two terms of the query terms in FIG. 5, and obtain a related score matrix "P'," which is shown in FIG. 7, according to the calculated related scores.

Figure 8:
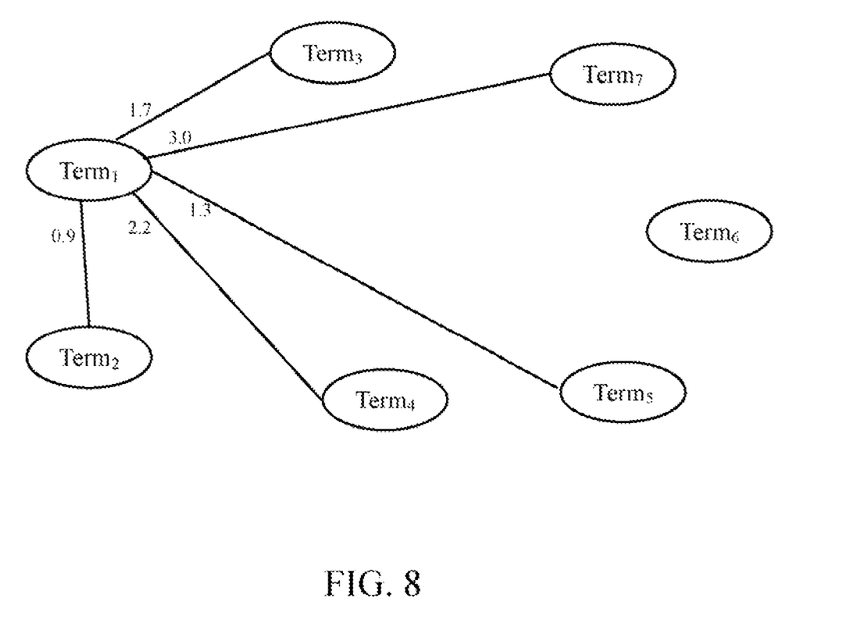
FIG. 8 is an exemplary topological diagram of indirect relationship of a plurality of query terms.
Figure 9:
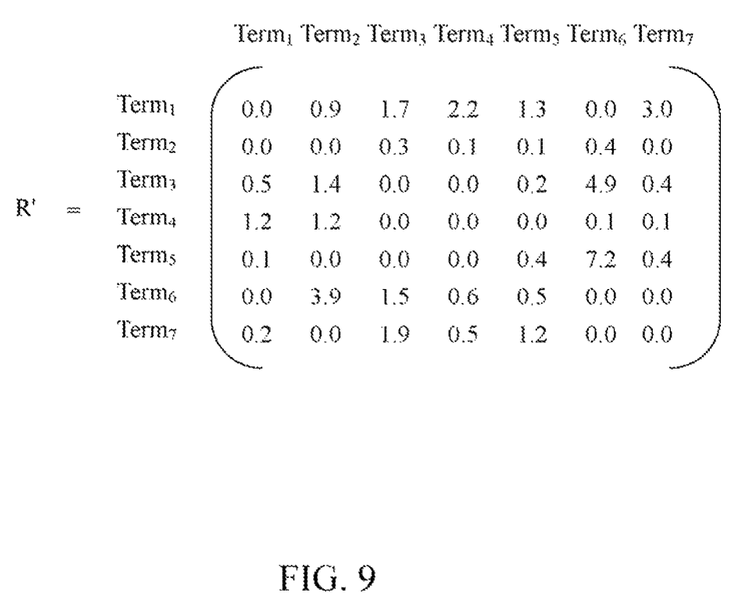
FIG. 9 is an example of an indirect related matrix created from the topological diagram of FIG. 8.

In block S3, the third calculation module 203 calculates an indirect relationship "R'$_{i,j}$" between every two of the query terms according to the direct relationship "R$_{i,j}$" and the related score "P$_{i,j}$" between every two terms, and stores the calculated indirect relationships in the storage device 23. In one embodiment, the indirect relationship "R'$_{i,j}$" between every two terms of the query terms is calculated by a formula of R'$_{i,j}=\Sigma_{K=1}^{n}$R$_{i,k}$*P$_{k,j}$, k≠i,k, where the variable "n" represents a total number of the query terms, for example, n=7 as shown in FIG. 4. FIG. 8 shows an exemplary topological diagram of the indirect relationship between "Term$_1$" and other query terms. FIG. 9 shows an example of an indirect related matrix "R'" created from the topological diagram of FIG. 8, where each element "R'$_{i,j}$" in the indirect related matrix "R'" represents an indirect relationship between "Term$_i$" and "Term$_j$".

In block S4, the related term determining module 204 determines indirect terms of each query term according to the indirect relationship between every two terms of the query terms, and stores the determined indirect terms in the storage device 23 of the electronic device 2. Then, the searching module 205 performs a search operation according to the determined indirect terms to obtain search results from a data source, and displays the search results on the display device 20 of the electronic device 2. The data source may be the Internet, at least one database, or at least one file system. In one embodiment, the related term determining module 204 determines that a first term of the query term is the indirect term of a second term of the query terms if the indirect relationship between the first term and the second term is greater than or equal to a preset value. The preset value may be 1.0. For example, as shown in FIG. 9, the indirect terms of "Term$_1$" include "Term$_3$," "Term$_4$," "Term$_5$," and "Term$_7$" whose indirect relationships are greater than 1.0.

In one embodiment, if the term "A" has the direct relationship with the term "B," and the term "B" further has the direction relationship with the term "C," which is referred to as A→B→C. Then the related term search system 24 determines that the term "A" has the indirect relationship with the term "C", which is called a second-level relationship. In other embodiments, the system 24 may determine a third-level relationship or multi-level relationship using the above-mentioned method. For example, if the term "A" has the direct relationship with the term "B," the term "B" further has the direction relationship with the term "C," and the term "C" further has the direction relationship with a term "D," which is referred to as A→B→C→D. Then the system 24 determines that the term "A" has the indirect relationship with the term "D", which is called the third-level relationship.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for searching related terms using an electronic device, the method comprising:
    obtaining a plurality of query terms from a storage device of the electronic device;
    calculating a direct relationship "R$_{i,j}$" between every two of the query terms, and obtaining a direct related matrix "R" according to the direct relationships;
    calculating a related score "P$_{i,j}$" between every two of the query terms, and obtaining a related score matrix "P" according to the related scores;
    calculating an indirect relationship "R'$_{i,j}$" between every two of the query terms according to the direct relationship "R$_{i,j}$" and the related score "P$_{i,j}$" between every two terms;
    determining indirect terms of each query term according to the indirect relationship between every two of the query terms, and storing the determined indirect terms in the storage device of the electronic device, a first term of the query term being determined as the indirect term of a second term of the query terms upon the condition that the indirect relationship between the first term and the second term is greater than or equal to a preset value; and
    obtaining search results from a data source by performing a search operation according to the determined indirect terms, and displaying the search results on a display device of the electronic device.

2. The method according to claim 1, wherein the related score "P$_{i,j}$" between every two of the query terms is obtained by calculating a conditional probability between every two of the query terms.

3. The method according to claim 1, wherein the indirect relationship "R'$_{i,j}$" between every two of the query terms is calculated by a formula of R'$_{i,j}=\Sigma_{K=1}^{n}$R$_{i,k}$*P$_{k,j}$, k≠i,k, wherein the variable "n" represents a total number of the query terms.

4. The method according to claim 1, wherein the preset value is 1.0.

5. An electronic device, comprising:
    a storage device;
    at least one processor; and
    one or more modules that are stored in the storage device and are executed by the at least one processor, the one or more modules comprising instructions:
    to obtain a plurality of query terms from the storage device;
    to calculate a direct relationship "R$_{i,j}$" between every two of the query terms, and obtain a direct related matrix "R" according to the calculated direct relationships;
    to calculate a related score "P$_{i,j}$" between every two terms of the query terms, and obtain a related score matrix "P" according to the calculated related scores;
    to calculate an indirect relationship "R'$_{i,j}$" between every two of the query terms according to the direct relationship "R$_{i,j}$" and the related score "P$_{i,j}$" between every two terms;
    to determine indirect terms of each query term according to the indirect relationship between every two of the query terms, and store the determined indirect terms in the storage device, a first term of the query term being determined as the indirect term of a second term of the query terms upon the condition that the indirect relationship between the first term and the second term is greater than or equal to a preset value; and to obtain search results from a data source by performing a search operation according to the determined indirect terms, and display the search results on a display device of the electronic device.

6. The electronic device according to claim 5, wherein the related score "$P_{i,j}$" between every two of the query terms is obtained by calculating a conditional probability between every two of the query terms.

7. The electronic device according to claim 5, wherein the indirect relationship "$R'_{i,j}$" between every two of the query terms is calculated by a formula of $R'_{i,j} = \Sigma_{K=1}^{n} R_{i,k} * P_{k,j}$, k≠i,k, wherein the variable "n" represents a number of the query terms.

8. The electronic device according to claim 5, wherein the preset value is 1.0.

9. A non-transitory storage medium having stored thereon instructions that, when executed by a processor of an electronic device, causes the processor to perform a method for searching related terms using the electronic device, the method comprising:

obtaining a plurality of query terms from a storage device of the electronic device;
  calculating a direct relationship "$R_{i,j}$" between every two of the query terms, and obtaining a direct related matrix "R" according to the calculated direct relationships;
  calculating a related score "$P_{i,j}$" between every two terms of the query terms, and obtaining a related score matrix "P" according to the calculated related scores;
  calculating an indirect relationship "$R'_{i,j}$" between every two of the query terms according to the direct relationship "$R_{i,j}$" and the related score "$P_{i,j}$" between every two terms;
  determining indirect terms of each query term according to the indirect relationship between every two of the query terms, and storing the determined indirect terms in the storage device of the electronic device, a first term of the query term being determined as the indirect term of a second term of the query terms upon the condition that the indirect relationship between the first term and the second term is greater than or equal to a preset value; and
  obtaining search results from a data source by performing a search operation according to the determined indirect terms, and displaying the search results on a display device of the electronic device.

10. The non-transitory storage medium according to claim 9, wherein the related score "$P_{i,j}$" between every two of the query terms is obtained by calculating a conditional probability between every two of the query terms.

11. The non-transitory storage medium according to claim 9, wherein the indirect relationship "$R'_{i,j}$" between every two of the query terms is calculated by a formula of $R'_{i,j} = \Sigma_{K=1}^{n} R_{i,k} * P_{k,j}$, k≠i,k, wherein the variable "n" represents a total number of the query terms.

12. The non-transitory storage medium according to claim 9, wherein the preset value is 1.0.

13. The non-transitory storage medium according to claim 9, wherein the medium is selected from the group consisting of a hard disk drive, a compact disc, a digital video disc, and a tape drive.

* * * * *